(12) United States Patent
Lin

(10) Patent No.: US 9,781,260 B2
(45) Date of Patent: Oct. 3, 2017

(54) DETECTION AND NOTIFICATION OF END USER PRESENCE VIA A TELECOMMUNICATIONS DEVICE

(71) Applicant: Vonage Business Inc., Atlanta, GA (US)

(72) Inventor: Xuhua Lin, Edison, NJ (US)

(73) Assignee: Vonage Business Inc., Atlanta, GA (US)

( * ) Notice: Subject to any disclaimer, the term of this patent is extended or adjusted under 35 U.S.C. 154(b) by 661 days.

(21) Appl. No.: 13/872,836

(22) Filed: Apr. 29, 2013

(65) Prior Publication Data
US 2014/0321335 A1 Oct. 30, 2014

(51) Int. Cl.
*H04L 12/66* (2006.01)
*H04M 3/42* (2006.01)

(52) U.S. Cl.
CPC ... *H04M 3/42365* (2013.01); *H04M 3/42017* (2013.01)

(58) Field of Classification Search
USPC ................ 370/259–261, 351–356; 379/201.07–201.1, 202.01–206.01
See application file for complete search history.

(56) References Cited

U.S. PATENT DOCUMENTS

| | | | |
|---|---|---|---|
| 6,842,505 B1 | 1/2005 | Suder et al. | |
| 7,120,238 B1 | 10/2006 | Bednarz et al. | |
| 7,620,160 B2 | 11/2009 | Tidwell et al. | |
| 8,548,145 B2 * | 10/2013 | White et al. | 379/201.1 |
| 2007/0081640 A1 * | 4/2007 | Jachner | 379/88.16 |
| 2012/0039454 A1 * | 2/2012 | Hobbs | 379/201.01 |

* cited by examiner

*Primary Examiner* — Frank Duong
(74) *Attorney, Agent, or Firm* — Moser Taboada; Joseph Pagnotta

(57) ABSTRACT

Methods and apparatus for detection and notification of called party presence via a telecommunication device associated with a called party are provided herein. In some exemplary embodiments, a method for detection and notification of called party presence may include receiving a request to establish a telecommunication session, obtaining presence information derived from presence detection equipment associated with the telecommunication device responsive to the received request, determining presence of the called party based on the obtained presence information, and sending a notification message including an indication of the determined presence of the called party.

20 Claims, 4 Drawing Sheets

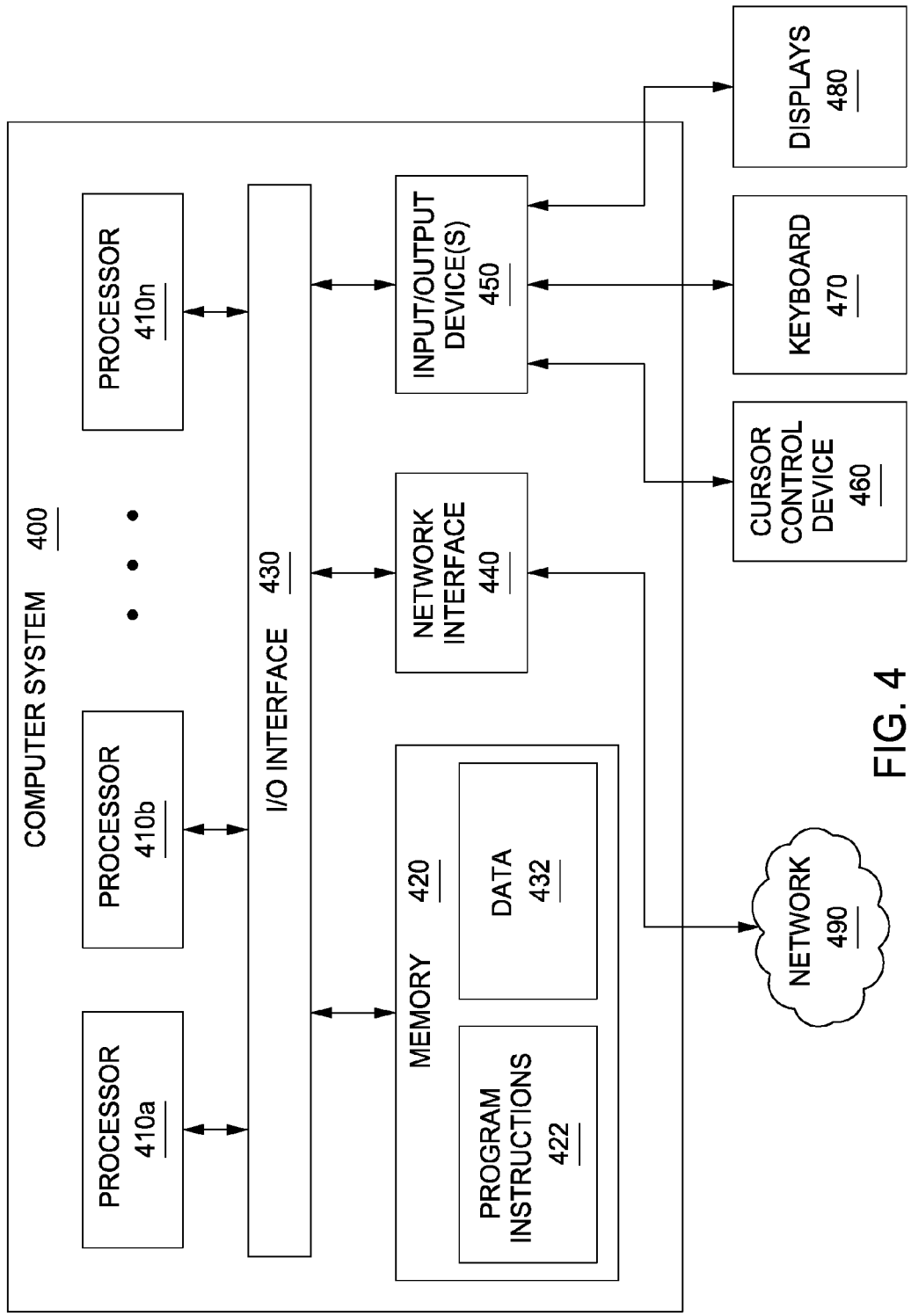

DETECTION AND NOTIFICATION OF END USER PRESENCE VIA A TELECOMMUNICATIONS DEVICE

BACKGROUND OF THE INVENTION

Field of the Invention

Embodiments of the present invention generally relate to telecommunication systems and, more particularly, to a method and apparatus for detection and notification of end user presence via a telecommunications device.

Description of the Related Art

Users of Voice over IP (VoIP), public switched telephone network (PSTN) services, and other mobile telecommunication services have access to a number of features associated with their service, such as call waiting, three-way calling, call forwarding, voicemail service, and the like. These services allow both the calling party and the called party to save time and increase productivity. However, a calling party may not wish to be forwarded to a voicemail service, or allow a call to ring over a certain number of times waiting for it to be answered by the called party. For example, if a calling party places a call to a called party while the called party is on another call, the call waiting feature may falsely indicate to the calling party that the called party phone is ringing but that that called party is not present. In other instances, the calling party may just wish to know if the called party is present.

Accordingly, there exists a need in the art for detection and notification of end user presence via a telecommunications device.

SUMMARY OF THE INVENTION

Methods and apparatus for detection and notification of called party presence via a telecommunication device associated with a called party are provided herein. In some exemplary embodiments, a method for detection and notification of called party presence may include receiving a request to establish a telecommunication session, obtaining presence information derived from presence detection equipment associated with the telecommunication device responsive to the received request, determining presence of the called party based on the obtained presence information, and sending a notification message including an indication of the determined presence of the called party.

In some embodiments, a method for notifying a calling party of presence of a called party may include sending a request to establish a telecommunication session, wherein the request includes a request for notification of called party presence, receiving a notification message including called party presence information, selecting a ringback tone to play to the calling party based on received called party presence information, and playing the selected ringback tone to the calling party.

In some embodiments, a method for notifying a calling party of presence of a called party may include receiving a request to establish a telecommunication session between a calling device and a called device, obtaining called party presence information derived from presence detection equipment associated with the called party device, determining presence of the called party based on the obtained presence information, and notifying the calling party of the determined presence of a called party.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4 depicts a computer system that can be utilized in various embodiments of the present invention, according to one or more embodiments.

Figure 1:
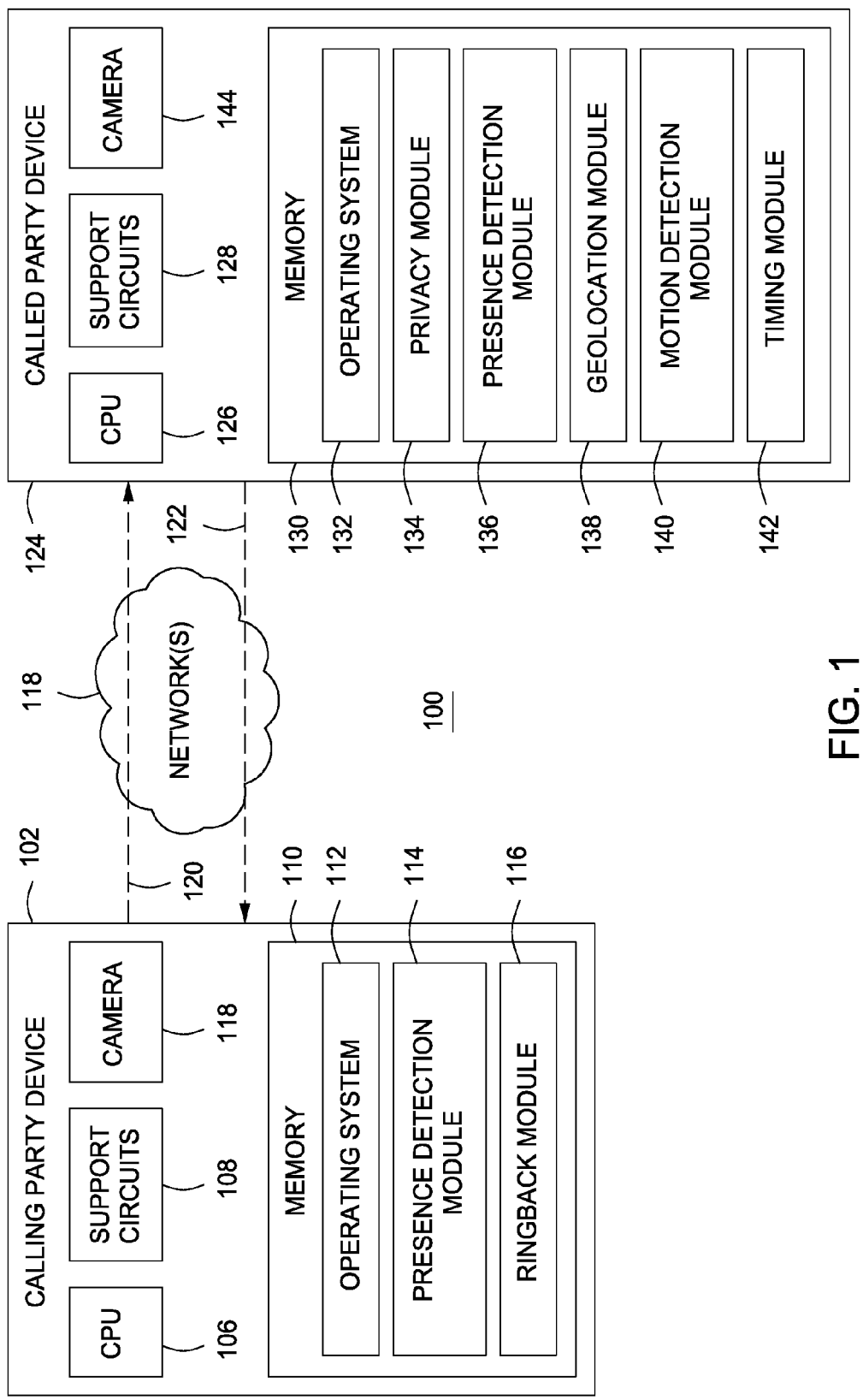
FIG. 1 depicts a block diagram of a system for facilitating the detection and notification of end user presence via a telecommunications device, according to one or more embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention include methods and apparatus for detection and notification of end user presence via a telecommunications device. Embodiments of the present invention advantageously provide customizable features for detection and notification of end user presence, particularly with respect to Voice over Internet Protocol (VoIP) service providers through the use of customizable ringback tones. A ringback tone (or "RBT" or ringing tone) is an audible indication that is heard on the telephone line by the caller (also known as the calling party) while the callee device (also known as the called party device) they are calling is being rung. It is normally a repeated tone, designed to assure the calling party that the called party's line is ringing.

Embodiments of the present invention advantageously include local determination of called party presence information and notification of said presence information that can trigger customizable ringback tones that notify the caller of the called party's presence. Those skilled in the art will appreciate that embodiments of the present invention can also be used with non-VoIP telephony providers and subscribers. Embodiments of the present invention are described below with respect to FIGS. 1-4.

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 depicts a block diagram of a telecommunication system 100 for facilitating the detection and notification of end user presence, according to one or more embodiments. The system 100 comprises a plurality of telecommunication devices for communicating with each other. For example, in FIG. 1, a calling party telecommunication device 102 may be used by a calling party to establish telecommunication sessions (e.g., telephone calls) to one or more called party telecommunications devices 124.

In some embodiments, the calling party telecommunication device 102 may be a mobile device or a wired device. In some embodiments, the calling party device 102 may represent an end user device coupled to a terminal adapter that provides access to telephony services (e.g., VoIP services). The called party telecommunication device 102 comprises a Central Processing Unit (CPU) 106, support circuits 108, and memory 110. The CPU 106 may comprise one or more commercially available microprocessors or microcontrollers that facilitate data processing and storage. The various support circuits 108 facilitate the operation of the CPU 106 and include one or more clock circuits, power supplies, cache, input/output circuits, and the like. The memory 110 comprises at least one of Read Only Memory (ROM), Random Access Memory (RAM), disk drive storage, optical storage, removable storage and/or the like. In some embodiments, the memory 110 comprises an operating system 112. The operating system (OS) 112 generally manages various computer resources (e.g., network resources, file processors, and/or the like). The operating system 112 is configured to execute operations on one or more hardware and/or software modules, such as Network Interface Cards (NICs), hard disks, virtualization layers, firewalls and/or the like. Examples of the operating system 112 may include, but are not limited to, LINUX, MAC OSX, BSD, UNIX, MICROSOFT WINDOWS, IOS, ANDROID and the like.

The calling party device 102 may establish a communication session with called party device 124 over one or more networks 118. Networks 118 may be, for example, one or more interconnected networks such as an Internet Protocol (IP) network, a public switched telephone network (PSTN), or a mobile telephony service provider network. In some embodiments, the calling party device 102 may be a VoIP device and may use the Session Initiation Protocol (SIP) for establishing a telecommunication session with another device such as called party device 124. The details and functionality of SIP can be found in the Internet Engineering Task Force (IETF) Request for Comments Paper No. 3261. In some embodiments, a modified SIP header included in an SIP INVITE message (e.g., communication 120) may be used to request presence information of the called party as will be described below in further detail.

In some embodiments, the memory 110 further comprises a presence detection module 114 and a ringback module 116. The presence detection module 114 may be used to request presence information from the called party device 124 when establishing a communication session. In some embodiments, all calls played by using the calling party device 102 may request presence information from the called party device 124, or the called party device 124 may provide presence information by default without being requested by the calling party device 102. The presence detection module 114 may be used to parse incoming notification messages from called party device 124 including an indication of the presence of the called party. The ringback module 116 may use the indication of the presence of the called party in order to select a ringback tone to play on the calling party device 102 to indicate the presence of the called party, or lack thereof. In addition, in some embodiments, the ringback module 116 provides an interface to the end user to allow for customization of the desired ringback notification.

In some embodiments, called party telecommunication device 124 may be a mobile phone capable of performing embodiments of the present invention. In other embodiments, the called party telecommunication device 124 may be a terminal adaptor (TA) configured to provide access to telephony services to other end user devices (e.g., a VoIP TA). The called party telecommunication device 124 comprises a Central Processing Unit (CPU) 126, support circuits 128, and memory 130. The CPU 126 may comprise one or more commercially available microprocessors or microcontrollers that facilitate data processing and storage. The various support circuits 128 facilitate the operation of the CPU 126 and include one or more clock circuits, power supplies, cache, input/output circuits, and the like. The memory 130 comprises at least one of Read Only Memory (ROM), Random Access Memory (RAM), disk drive storage, optical storage, removable storage and/or the like. In some embodiments, the memory 130 comprises an operating system 132. The operating system (OS) 132 generally manages various computer resources (e.g., network resources, file processors, and/or the like). The operating system 132 is configured to execute operations on one or more hardware and/or software modules, such as Network Interface Cards (NICs), hard disks, virtualization layers, firewalls and/or the like. Examples of the operating system 132 may include, but are not limited to, LINUX, MAC OSX, BSD, UNIX, MICROSOFT WINDOWS, IOS, ANDROID and the like.

In some embodiments, the memory 130 further comprises a privacy module 134, a presence detection module 136, and various presence detection equipment such as, but not limited to, geolocation module 138, a motion detection module 140, timing module 142, audio detection equipment, and one or more cameras 144.

The privacy module 134 stores privacy configuration settings for called party telecommunication device 124. The privacy configuration settings stored in privacy module 134 may be initially set to default setting but are generally configurable by an end user of called party telecommunication device 124. For example, the privacy configuration settings may be set by the end user to allow or block any request for presence information of the end user. In some embodiments, the privacy module 134 may be coupled to a binary switch on telecommunication device 124 that either allows presence information to be obtained or not obtained using presence detection equipment of the called party telecommunication device 124.

The presence detection module 136 may analyze information obtained from presence detection equipment (e.g., geolocation module 138, a motion detection module 140, timing module 142, and one or more camera 144). In some embodiments, presence detection module 136 may activate and control said presence detection equipment in order to obtain presence information of the called party. Based on the obtained presence information, the presence detection module 136 may determine whether the called party is present or not present. In some embodiments, the presence detection module 136 may store historical presence information for use in determining the presence of the called party. In some embodiments, the historical presence information may be stored in memory 130 and may be accessed via calls to an interface, such as an application program interface (API). For example, the presence detection module 136 may store the previous X seconds/minutes of geolocation data, motion detection data, accelerometer data, etc., where X is a configurable value. Upon receiving a request to establish a telecommunication session (e.g., receiving an SIP INVITE message), the called party device may use calls to an API to access the historical presence information to determine the presence of the called party.

In some embodiments, the presence detection module 136 may prepare, or facilitate the preparation of, the necessary response messages (e.g., communication 122) to indicate the presence, or lack thereof, of the called party.

Although the presence detection modules 114 and 136, and ringback module 116, are described above as being included in the memory of the calling party device and/or the called party device, in some embodiments these modules may be located on equipment/servers disposed in network 118. For example, in some embodiments, a telecommunication server/router may include a presence detection module and/or ringback module to perform the functions described above. The telecommunication server/router may request presence information from the called party device upon receiving a request to establish a communication session between the calling party device and the called party device.

In other embodiments, the presence detection modules 114 and 136, and ringback module 116 may be included in devices that are attached as peripheral device(s) to the called party device and/or the calling party device.

The geolocation module 138 may determine a location of the called party telecommunication device 124 at a given point in time. The location of the called party telecommunication device 124 may be determined using Global Positioning Satellite (GPS) equipment and information, WiFi triangulations, cell tower ID, Near Field Communication (NFC), and the like. In some embodiments, the geolocation module 138 and geolocation devices may be built into the called party device 124 or may be externally attached and communicatively coupled to the called party device 124 (e.g., attached to a mobile phone or TA). In some embodiments, geolocation module 138 may determine changes in location of the called party telecommunication device 124 or rate of change in location of the called party telecommunication device 124. In other embodiments, the geolocation module may provide location information to the presence detection module 136, and the presence detection module 136 may determine changes in location of the called party telecommunication device 124 or rate of change in location of the called party telecommunication device 124.

The motion detection module 140 may include one or more sensors for detecting the motion of the called party telecommunication device 124 itself (e.g., such as accelerometers, and the like) and/or detecting the motion of people around the device (e.g., such as using infrared, ultrasonic, microwave, tomographic, light sensing, detectors.) In some embodiments, motion detection module 140 may use information obtained from cameras 144 to detect motion. In some embodiments, the motion detection module 140 and motion detection devices may be built into the called party device 124 or may be externally attached and communicatively coupled to the called party device 124 (e.g., attached to a mobile phone or TA). In some embodiments, the motion detection module 140 may provide the information obtained to the presence detection module 136 for presence analysis.

The timing module 142 may include one or more timers for keeping track of various actions that may indicate the presence of the called party. For example, timing module 142 may keep track of the last call made or actively answered by the called party, active texting activity, last physical input by the use, etc. In some embodiments, the timing module 142 may provide the information obtained to the presence detection module 136 for presence analysis.

In some embodiments, the cameras 144 may be built into the called party device 124 or may be externally attached and communicatively coupled to the called party device 124 (e.g., attached to a TA). The cameras may provide the obtained presence information to the presence detection module 136 for presence analysis. In some embodiments, images (still or video) captured by cameras 144 of the called party device may be analyzed to determine if a called party is present, or was recently present (i.e., within the last X seconds/minutes).

Figure 2:
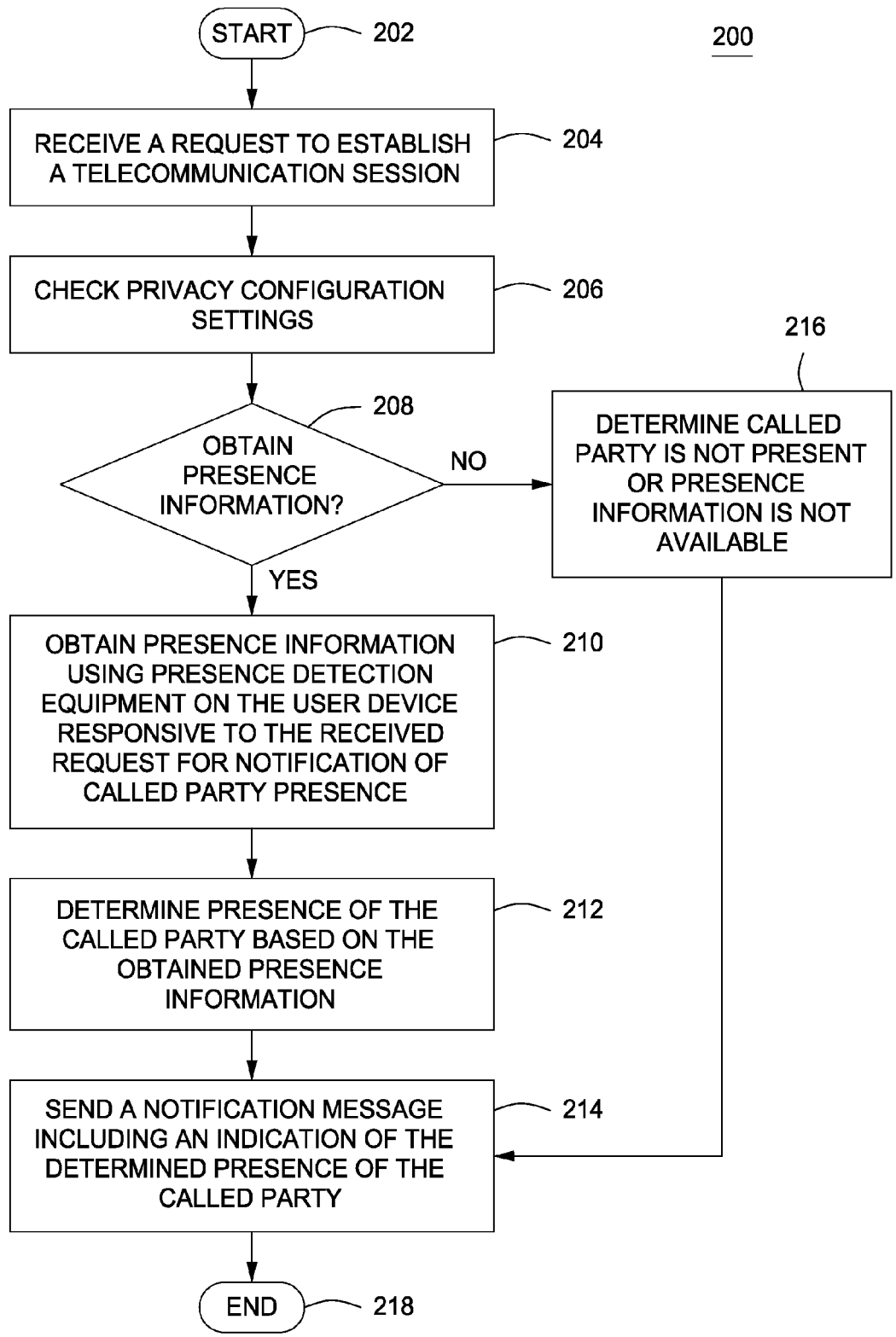
FIG. 2 depicts a flow diagram of a method for facilitating the detection and notification of end user presence via a telecommunications device, according to one or more embodiments.

FIG. 2 depicts a flow diagram of a method 200 for detection and notification of called party presence via a telecommunication device associated with a called party. The method 200 starts at 202 and proceeds to 204. At 204, a called party device 124 receives a request to establish a telecommunication session. For example, the called party device 124 may receive the request from calling party device 102. In some embodiments, the request to establish a telecommunication session includes a request for notification of called party presence. For example, in some embodiments, an SIP INVITE message sent by calling party device 102 to initiate telecommunication service may be received by called party device 124. The SIP INVITE message may include a modified SIP header that requests presence information of the called party. In other embodiments, the request for called party presence information may be included in other portions of the SIP INVITE message, or in a separate SIP notification/request sent by calling party device 102. In other embodiments, other protocols for establishing telecommunication sessions between the devices may be used, for example, such as SS7 and the like. The request for called party presence information may be included in those signaling messages for establishing telecommunication sessions between the devices.

In some embodiments, before presence information can be obtained, the method 200 optionally proceeds to 206. At 206, privacy configuration settings are checked to determine of the called party has authorized the acquisition of presence information. Specifically, the called party may manually configure the privacy settings such that no presence information may be obtained. In some embodiments, this may be accomplished via a software interface (e.g., a check box, radio button, etc.) or via a binary switch the may be manually and physically activated on the called party device 124 by the end. If, at 208, it is determined that presence information may be obtained based on the privacy settings set by the called party, the method 200 proceeds to 210.

At 210, presence information is obtained using presence detection equipment on, or otherwise associated with, the telecommunication device responsive to the received request for notification of called party presence. In some embodiments, the presence detection equipment may be activated once the request for called party presence information is received. For example, in some embodiments, when the request for called party presence information is received, the motion detection module 140 may activate accelerometers to obtain acceleration information of the called party device 124 (e.g., for determine if the called party device moved in the case of a mobile phone), or may activate IR motion sensors (e.g., for determine if anyone was in the vicinity of the called party device 124 in the case of a TA or mobile phone). In some embodiments, obtaining presence information using presence detection equipment may include one or more of, obtaining geolocation information (or changes thereof), video camera or still camera images, time since last active use of the called party device 124 by an end user, and the like. In some embodiments, the called party device 124 may continually store a certain amount of historical presence information prior to receiving a request to establish a telecommunication session. For example, the presence detection module 136 may continually store the last X seconds/minutes of geolocation data, motion detection data, accelerometer data, device use data, etc., where X may be a configurable value. Upon receiving a request to establish a telecommunication session (e.g., receiving an SIP INVITE message), the called party device may use this historical presence information for use in determining the presence of the called party. In other embodiments, the called party device may store the timestamp of the last motion detected, the last change in geolocation, the last time the device was used (e.g., for making/receiving a call or text message, app used, human input of any kind detected), etc. If the timestamp falls within a certain threshold time window, the called party may be determined to be present. In some embodiments, the threshold time window may be configurable by either the called party or the calling party.

At 212, after called party presence information is obtained using presence detection equipment, the called party device 124 determines whether or not the called party is present based on the obtained presence information from the presence detection equipment. That is, the called party device 124 analyzes (e.g., using presence detection module 136) the obtained presence information to determine if the called party is present.

In some embodiments, if the presence information is obtained from geolocation equipment (e.g., GPS equipment and information, WiFi triangulations, cell tower ID, Near Field Communication (NFC), etc.), the called party device 124 may analyze the geolocation information to determine if the called party device 124 has moved. If so, the presence detection module 136 may determine that the called party is present. In some embodiments, the presence detection module 136 may also determine how fast the location has changed and provide that velocity information as well. The velocity information may be sent to the calling party to indicate that although the called party is present, they may be in a car driving, for example, and may not be able to pick up the phone.

In some embodiments, if the presence information is obtained from motion detection sensors, the called party device 124 may analyze the motion detection information to determine whether a human is present or if it was just a pet or child that was detected.

In some embodiments, the called party device 124 may not be able to detect or verify the presence and may determine that the called party is not present/available.

Once the presence, or lack thereof, of the called party is determined at 212, the method proceeds to 214. At 214, a notification message is sent to the calling party including an indication of the determined presence of the called party. In some embodiments, the notification message sent by the called party device 124 may be one of a SIP TRYING response or a SIP RINGING response message generated including the indication of the determined presence of the called party. In some embodiments, the indication of the determined presence of the called party may be included in a header of the SIP TRYING response or the SIP RINGING response message. In other embodiments, other signaling messaging may be used.

If at 208 it is determined that the called party has not authorized the acquisition of presence information via the privacy configuration settings, the method proceeds to 216. At 216, the called party device 124 will determine that presence information is not available and will prepare and send the notification message at 214 without sending any presence information accordingly. The method 200 ends at 218.

Although the method of FIG. 2 was described in terms of the called party device, in some embodiments, portions of this method may be performed on the network 118 as described above. For example, in some embodiments, a telecommunication server/router may include a presence detection module to perform portions of the method of FIG. 2 described above. The telecommunication server/router may request presence information from the called party device upon receiving a request to establish a communication session between the calling party device and the called party device.

Figure 3:
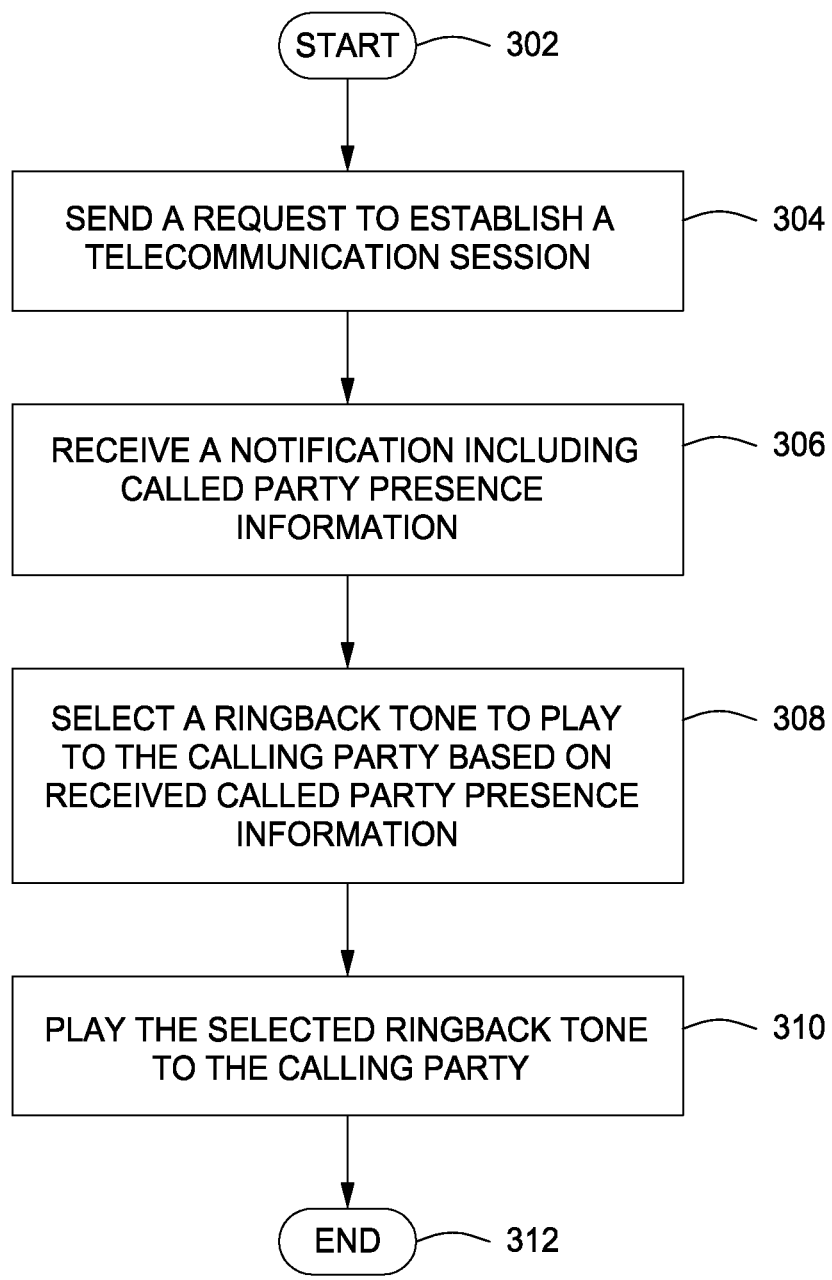
FIG. 3 depicts a flow diagram of a method for notifying a calling party of presence of a called party, according to one or more embodiments.

FIG. 3 depicts a flow diagram of a method 300 for notifying a calling party of presence of a called party. The method 300 starts at 302 and proceeds to 304. At 304, a request to establish a telecommunication session is send by the calling party device 102 to the called party device 124. For example, in some embodiments, an SIP INVITE message may be sent by calling party device 102 to initiate telecommunication service with called party device 124. The SIP INVITE message may include a modified SIP header that requests presence information of the called party. In other embodiments, the request for called party presence information may be included in other portions of the SIP INVITE message, or in a separate SIP notification/request sent by calling party device 102. In other embodiments, other protocols for establishing telecommunication sessions between the devices may be used, for example, such as SS7 and the like. The request for called party presence information may be included in those signaling messages for establishing telecommunication sessions between the devices.

At 306, a notification message from called party 124 including called party presence information is received by the calling party device 102 in response to the request sent. The presence information may be parsed and analyzed by calling party device 102 (e.g., via presence detection module 114) to extract the desired presence information. The presence detection module 114 may determine that the called party is present, not present, or present but unable to answer the call because they are possibly driving based on velocity information received.

In some embodiments, the notification message received by the calling party device 102 may be one of a SIP TRYING response or a SIP RINGING response message generated including the indication of the determined presence of the called party. In some embodiments, the indication of the determined presence of the called party may be included in a header of the SIP TRYING response or the SIP RINGING response message. In other embodiments, other signaling messaging may be used.

At 308, one of a plurality a ringback tones is selected to play to the calling party based on received called party presence information. In some embodiments, the plurality of ringback tones may be locally stored on the calling party device 102. The calling party may configure which ringtones will be played if the called party is present, not present, or present by likely unavailable.

In some embodiments, a first ringback tone may be selected and played when the called party presence information received indicates that the called party is present, and a second ringback tone different from the first ringback tone, may be selected and played when the called party presence information received indicates that the called party is not present. In other embodiments, the notification including called party presence information may further includes called party velocity information, as discussed above, that may indicate a speed at which the called party is traveling. In some embodiments, a ringback tone may be selected based on this called party velocity information.

In some embodiments, the notification message may include an amount of time since the device was last used or moved, or the last time motion was detected by the device. The calling party device may display this information to the calling party in addition to, or alternative to, playing a configured ringback tone. In other embodiments, the calling party may be notified of the presence of the called party by means other than a ringback tone. For example, the calling party device may flash lights, vibrate in a certain manner, provide a voice announcement, and the like.

At 310, the selected ringback tone is played to the calling party. The method 300 ends at 312.

Although the method of FIG. 3 was described in terms of the calling party device, in some embodiments, portions of this method may be performed on the network 118 as described above. For example, in some embodiments, a telecommunication server/router may include a presence detection module and/or ringback module to perform portions of the method of FIG. 3 described above.

Although described above in terms of determining the presence of the called party, in some embodiments, the presence of the calling party may similarly be determined. For example, a device associated with the calling party (e.g., a mobile phone or terminal adaptor) may pass its presence information to the called party as the calling party is making the call. The called party may want to make sure he/she is going to answer a real person, not automated messages (for example, automated political campaign message). In some embodiments, the calling party presence information can also be added into the SIP INVITE request header. Upon receipt of the calling party presence information, the called party device (i.e., the receiving device) can also play a different ring tone pending the presence information.

The embodiments of the present invention may be embodied as methods, apparatus, electronic devices, and/or computer program products. Accordingly, the embodiments of the present invention may be embodied in hardware and/or in software (including firmware, resident software, microcode, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

FIG. 4 depicts a computer system 400 that can be utilized in various embodiments of the present invention to implement the computer and/or the display, according to one or more embodiments.

Various embodiments of method and apparatus for transitioning between a plurality of pages on a display device, as described herein, may be executed on one or more computer systems, which may interact with various other devices. One such computer system is computer system 400 illustrated by FIG. 4, which may in various embodiments implement any of the elements or functionality illustrated in FIGS. 1-3. In various embodiments, computer system 400 may be configured to implement methods described above. The computer system 400 may be used to implement any other system, device, element, functionality or method of the above-described embodiments. In the illustrated embodiments, computer system 400 may be configured to implement methods 200 and 300 as processor-executable executable program instructions 422 (e.g., program instructions executable by processor(s) 410) in various embodiments.

In the illustrated embodiment, computer system 400 includes one or more processors 410*a*-410*n* coupled to a system memory 420 via an input/output (I/O) interface 430. Computer system 400 further includes a network interface 440 coupled to I/O interface 430, and one or more input/output devices 450, such as cursor control device 460, keyboard 470, and display(s) 480. In various embodiments, any of the components may be utilized by the system to receive user input described above. In various embodiments, a user interface may be generated and displayed on display 480. In some cases, it is contemplated that embodiments may be implemented using a single instance of computer system 400, while in other embodiments multiple such systems, or multiple nodes making up computer system 400, may be configured to host different portions or instances of various embodiments. For example, in one embodiment some elements may be implemented via one or more nodes of computer system 400 that are distinct from those nodes implementing other elements. In another example, multiple nodes may implement computer system 400 in a distributed manner.

In different embodiments, computer system 400 may be any of various types of devices, including, but not limited to, personal computer systems, mainframe computer systems, handheld computers, workstations, network computers, application servers, storage devices, a peripheral devices such as a switch, modem, router, or in general any type of computing or electronic device.

In various embodiments, computer system 400 may be a uniprocessor system including one processor 410, or a multiprocessor system including several processors 410 (e.g., two, four, eight, or another suitable number). Processors 410 may be any suitable processor capable of executing instructions. For example, in various embodiments processors 410 may be general-purpose or embedded processors implementing any of a variety of instruction set architectures (ISAs). In multiprocessor systems, each of processors 410 may commonly, but not necessarily, implement the same ISA.

System memory 420 may be configured to store program instructions 422 and/or data 432 accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 420. In other embodiments, program instructions and/or data may be received, sent or stored upon different types of computer-accessible media or on similar media separate from system memory 420 or computer system 400.

In one embodiment, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any necessary protocol, timing or other data transformations to convert data signals from one component (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computer system 400 and other devices attached to a network (e.g., network 490), such as one or more external systems or between nodes of computer system 400. In various embodiments, network 490 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 450 may, in some embodiments, include one or more display terminals, keyboards, keypads, touchpads, scanning devices, voice or optical recognition devices, or any other devices suitable for entering or accessing data by one or more computer systems 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In some embodiments, the illustrated computer system may implement any of the methods described above, such as the methods illustrated by the flowcharts of FIG. 2-3. In other embodiments, different elements and data may be included.

Those skilled in the art will appreciate that computer system 400 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A method for detection and notification of called party presence via a telecommunication device associated with a called party comprising:
   (a) receiving a request to establish a telecommunication session at the telecommunication device;
   (b) obtaining presence information derived from presence detection equipment on the telecommunication device responsive to the received request;
   (c) determining, via the telecommunication device, presence of the called party based on the obtained presence information; and
   (d) sending a notification message including an indication of the determined presence of the called party.

2. The method of claim 1, wherein the request includes a request for notification of called party presence.

3. The method of claim 1, wherein determining presence of the called party based on the obtained presence information is performed by the telecommunication device.

4. The method of claim 1, wherein privacy configuration settings set by the called party are checked prior to obtaining presence information, and wherein the presence information obtained is based on privacy configuration settings.

5. The method of claim 1, wherein the presence detection equipment comprises at least one of an accelerometer, a gyroscope, a camera, a motion detector, an audio detector, a timer, geolocation determination equipment, or an interface to access historical presence information associated with the telecommunication device.

6. The method of claim 5, wherein the historical presence information includes at least one of geolocation data, motion detection data, accelerometer data, telecommunication device use data, camera image data.

7. The method of claim 6, wherein the historical presence information includes a timestamp of a last motion detected, or of a last change in geolocation.

8. The method of claim 1, wherein the presence detection equipment includes at least one camera, and wherein presence of the called party is determined based on an analysis of images obtained by the at least one camera.

9. The method of claim 1, wherein the presence detection equipment includes geolocation detection equipment, and wherein presence of the called party is determined based on changes in a location of the telecommunication device obtained from the geolocation detection equipment.

10. The method of claim 1, wherein presence of the called party is determined based on an elapsed time of last use of at least one of the telecommunication device or of another device associated with the called party.

11. The method of claim 1, wherein the notification message sent further includes an amount of time that has elapsed since the telecommunication device was at least one of last used or moved, or the last time motion was detected by the telecommunication device.

12. The method of claim 1, wherein the request is a Session Initiation Protocol (SIP) INVITE message including the request for notification of called party presence.

13. The method of claim 12, wherein the request for notification of called party presence is included in a header of the SIP INVITE message.

14. The method of claim 1, wherein the notification message is one of a SIP TRYING response or a SIP RINGING response generated including the indication of the determined presence of the called party.

15. A method for notifying a calling party of presence of a called party comprising:
   (a) sending a request to establish a telecommunication session, wherein the request includes a request for notification of called party presence;
   (b) receiving a notification message including called party presence information, wherein the called party presence information is derived from presence detection equipment on the called party device;
   (c) selecting one of a plurality of ringback tones to play to the calling party based on received called party presence information; and
   (d) playing the selected ringback tone to the calling party.

16. The method of claim 15, wherein a first ringback tone is selected and played when the called party presence information received indicates that the called party is present, and wherein a second ringback tone is selected and played when the called party presence information received indicates that the called party is not present.

17. A method for notifying a calling party of presence of a called party comprising:
 (a) receiving a request to establish a telecommunication session between a calling device and a called device;
 (b) obtaining called party presence information derived from presence detection equipment on the called party device;
 (c) determining presence of the called party based on the obtained presence information; and
 (d) notifying the calling party of the determined presence of a called party.

18. The method of claim 17, wherein the presence detection equipment comprises at least one of an accelerometer, a gyroscope, a camera, a motion detector, an audio detector, a timer, geolocation determination equipment, or an interface to access historical presence information associated with the called device.

19. The method of claim 18, wherein the historical presence information includes at least one of geolocation data, motion detection data, accelerometer data, telecommunication device use data, camera image data.

20. The method of claim 17, wherein the calling party is notified of the determined presence of a called party by playing a specific ringback tone indicating the presence of a called party.

* * * * *